(12) United States Patent
Hamilton et al.

(10) Patent No.: US 6,501,394 B1
(45) Date of Patent: Dec. 31, 2002

(54) INTERFACE TERMINAL FOR THE VISUALLY IMPAIRED

(75) Inventors: Alistair R. Hamilton, Stony Brook, NY (US); Christine L. Enderby, Boston, MA (US); David P. Laughlin, Kettering, OH (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/442,669

(22) Filed: Nov. 18, 1999

(51) Int. Cl.[7] ................................................ H03K 17/94
(52) U.S. Cl. ........................ 341/27; 341/22; 340/825.19
(58) Field of Search ............................. 341/22, 27, 34, 341/35; 340/825.19; 361/755, 756

(56) References Cited

U.S. PATENT DOCUMENTS

| 5,311,175 A | * | 5/1994 | Waldman | 341/34 |
| 5,481,264 A | * | 1/1996 | Kim | 341/22 |
| 5,739,744 A | * | 4/1998 | Roca et al. | 341/35 |

* cited by examiner

Primary Examiner—Timothy Edwards, Jr.

(57) ABSTRACT

A computing device for visually impaired persons. In one embodiment, the device includes processing logic, input and output devices, a selectable member that has a plurality of functions associated therewith, and a device that indicates in a non-visual manner which-of said plurality of functions is associated with said selectable member at a given time. Several variations of the method and manner of non-visual function indication are disclosed.

12 Claims, 4 Drawing Sheets

INTERFACE TERMINAL FOR THE VISUALLY IMPAIRED

FIELD OF THE INVENTION

The present invention relates to interface terminals and more specifically to interface terminals for use by physically disabled individuals. The term interface terminal as used herein refers generally to any type of terminal that a human uses to interface with a machine having electronic control circuitry. Examples of interface terminals include automatic teller machines (ATMs), computerized library catalogue terminals, internet and email devices, self ticketing devices, retail self check out terminals, personal and industrial computers, and the like.

BACKGROUND OF THE INVENTION

With improvements in computer technology, more and more interface terminals are being implemented. A representative interface terminal is an ATM and this terminal is now used to introduce the present invention. ATMs typically display text messages or a text menu on a display screen. A plurality of control buttons are provided adjacent the display screen and, in use a text menu displayed on the screen is aligned with these buttons such that a user may make selections from the text menu. The functions provided by the control buttons normally change with each screen. This arrangement is very :well suited to a user with adequate vision. For a visually impaired user, however, this system is inadequate in that the changing functions of the control buttons cannot be followed. Hence, this and like interface terminals (i.e., interface terminals with user selection of control buttons or designation of on screen areas or the like) cannot be utilized by visually impaired individuals.

SUMMARY OF THE INVENTION

Accordingly, it is an object of the present invention to provide an interface terminal that can be utilized by physically disabled individuals.

It is another object of the present invention to provide an interface terminal that can be utilized by both visually unimpaired and visually impaired individuals.

It is also an object of the present invention to provide an interface terminal that provides adjacent the screen or at another accessible location a function bar or the like that permits non-visual selection of various changing functions.

These and related objects of the present invention are achieved by use of an interface terminal for the visually impaired as described herein.

The attainment of the foregoing and related advantages and features of the invention should be more readily apparent to those skilled in the art, after review of the following more detailed description of the invention taken together with the drawings.

DETAILED DESCRIPTION

Figure 1:
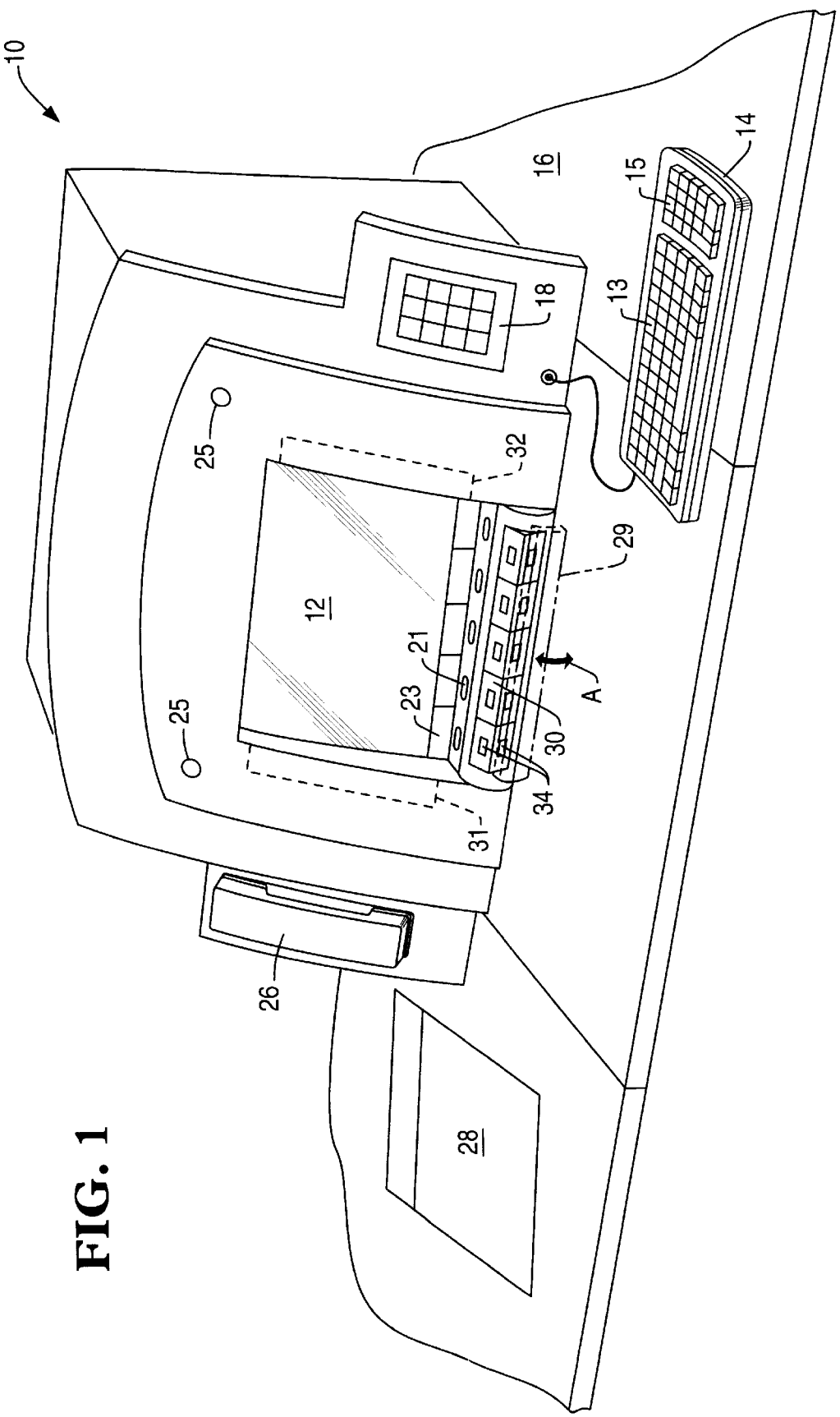
FIG. 1 is a perspective view of one embodiment of an interface terminal in accordance with the present invention.

Referring to FIG. 1, a perspective view of one embodiment of an interface terminal in accordance with the present invention is shown. The interface terminal of, FIG. 1 is provided in a desk top environment that includes a display screen 12 positioned above a desk top 16. A keyboard 14 (that includes an alpha keypad 13 and a numeric keypad 15) may be movably or non-movebly provided on or in desk top 16. A numeric keypad 18 could alternatively be provided adjacent screen 12 as is often the case in conventional ATM arrangements. A modem 22 and/or Ethernet adapter card 24 or the like (shown in FIG. 2) are preferably provided in interface terminal 10 as are speakers 25 for audio output. A telephone 26 is also preferably included to permit a user to perform any telephone function including, but not limited to, conducting long distance Internet telephone calls, contacting customer service or other help services, etc. A printer 28 or other output device may also be provided in association with interface terminal 10. Printer: 28 may be a Braille printer, ticket printer, receipt printer or any other appropriate output device associated with the function for which the interface terminal was designed. While interface terminal 10 is shown in a desk top environment in FIG. 1, it should be recognized that the interface terminal of the present invention may be provided in a wall mount or portable or other environment.

A roller bar 30 or the like is preferably provided adjacent screen 12 and adjacent control buttons 21 (if control buttons are utilized). While roller bar 30 is shown at the base of screen 12 of FIG. 1, it should be recognized that the roller bar could alternatively or additionally be provided at other locations adjacent the screen, for example, locations 31, 32, or at locations spaced from the screen. Placing the roller bar adjacent screen 12 permits use of a touch screen (as opposed to control buttons or the like) in conjunction with the roller bar as discussed in more detail below. While the roller bar is preferably placed adjacent screen 12, it should be recognized, however, that the roller bar may be provided away from the screen as part of the interface terminal housing or separate therefrom such as an external mouse or the like. A protection plate 29 that rotates in the direction of Arrow A protects roller bar 30 when not in use may also be provided.

In one embodiment, roller ball 12 includes a plurality of axially distributed faces 33 (FIG. 2) each with a plurality of information fields 34. The roller bar rotates such that only one face 33 is fully visible at a time. Information fields 34 preferably include Braille characters, a code or some other representation that is detectable by tactile sensation. As text menus on screen 12 change, the software signal that initiates creation of a new text menu also preferably sends a signal to a motor that rotates the roller bar such that a new and corresponding face of control button designations is presented to the user. For example, in a typical ATM transaction, face 1 may utilize 3 of the information fields thereon to designate Code Entered OK, Code Not Entered OK-Restart and More Time Needed. Face 2 may have information fields that include Deposit, Withdrawal and Other Transaction, etc. Face 3 may have commands like Enter Amount Then Push Button, After Beep Insert Envelope, and Push Button For More Time. Face 4 may contain similar prompts for a withdrawal. Face 5 may handle other transactions including balance inquiries, while face 6 may include prompts such as Want Other Transaction?

Exit?, etc. It should be noted that when appropriate codes for the above expressions are preferably utilized to conserve space.

While presented here for an ATM application it should be clear that this concept can be applied to all other existing interface terminal applications and to those interface terminal applications not yet developed. The roller bar could also be implemented in such a way that it presents information (commands, responses to questions, etc.) in addition to simply identifying button function. In this manner, the roller bar could provide enhanced interactive functions including, for example, functioning as a I/O device for a computer game or as a blind calculator or otherwise.

Figure 2:
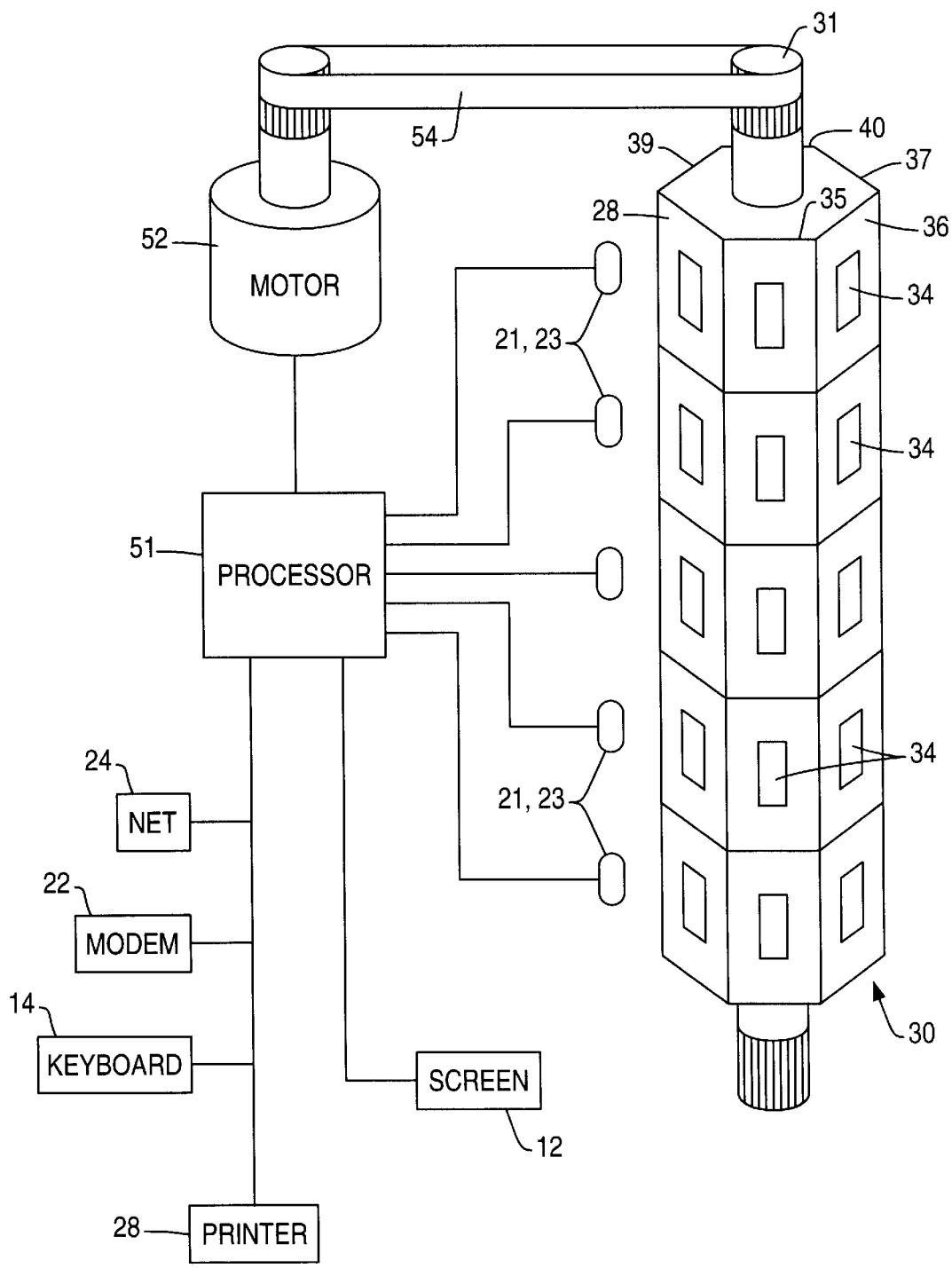
FIG. 2 is a diagram of a roller bar and its relationship with other components of an interface terminal in accordance with the present invention.

Referring to FIG. 2, a diagram of a roller bar and its relationship with other components of an interface terminal in accordance with the present invention is shown. FIG. 2 illustrates a processor or controller 51 that is coupled between the designation items (control buttons 21 or touch screen areas 23, etc.) and drive motor 52. Drive motor 52 is preferably of the type used in robotics and automated assembly lines and is coupled to a drive axle 31 of roller bar 30 by drive belt 54. In the embodiment of FIG. 2, roller bar 30 is shown as having 6 axial faces individually enumerated with reference numerals 35–40. Each of the faces 35–40 includes a plurality of information fields 34. Processor 51 may be a conventional microprocessor such as those made by Intel Corporation, Santa Clara, Calif. or the like. Processor 51 executes conventional code to display text or graphics menus on screen 12 such !as conventional ATM text menus or conventional computer text graphic menus. In accordance with the present invention, processor 51 preferably also executes code that sends a signal to motor 52 when a new text (or graphics) menu is displayed which causes the motor to rotate the roller bar to a position in which the appropriate information fields (those that correspond with the information in the menu) are presented to the user (e.g., presented adjacent the control buttons). In a preferred embodiment, the information fields are preferably aligned with the control buttons in the same manner that the menu prompts are aligned with the control buttons.

FIG. 2 also illustrates the coupling of other devices such as modem 22, Ethernet adapter card 24, screen 12, keyboard 14 and printer 28.

Figure 3:
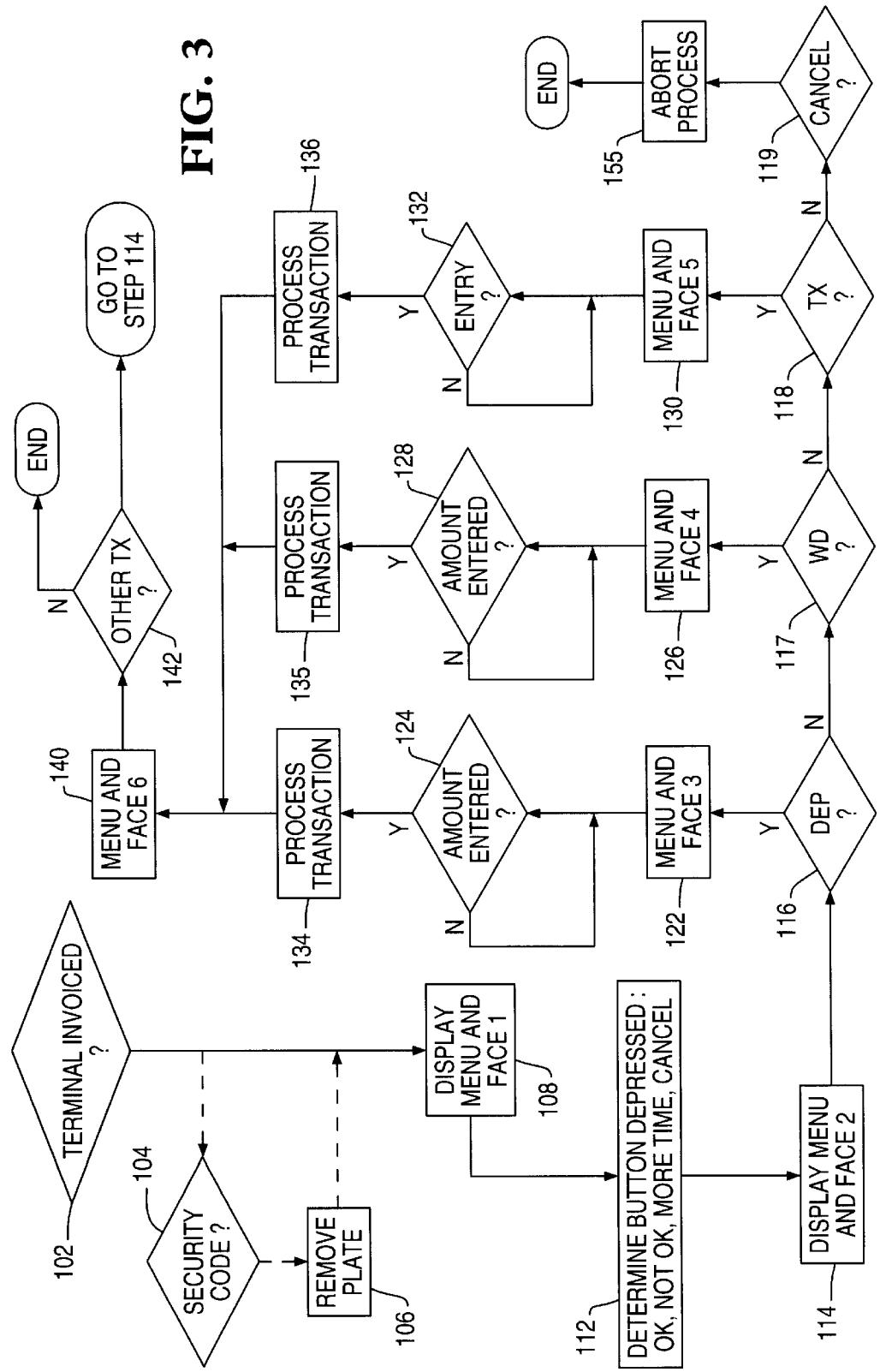
FIG. 3 is a flow diagram of software executing in an interface terminal in accordance with the present invention.

Referring to FIG. 3, a flow diagram of software executing in interface terminal 10 in accordance with the present invention is shown. The diagram of FIG. 3 is intended to be representative of possible code that can implement the above-described scenario in which roller bar 30 or another non-visually aided input device is provided in an ATM. As eluded to above, the software, roller bar configuration and information field content will vary as appropriate in other applications.

In step 102, a determination is made as to whether the interface terminal is being invoked. If an optional security mechanism (such as cover plate 29) is provided, a user may be prompted (step 104) to enter a security code or the security code may be preprogrammed with the users account or access number. Cover plate 29 or the like is removed to permit access to the roller bar (step 106).

In step 108, the first text screen and corresponding roller bar face are presented. A determination is then made (step 112) as to which button (or screen area on a touch screen) is pressed (i.e., Code OK, Code Not OK, More Time, Cancel).

Assuming the authorization (e.g. personal identification number) is entered correctly, a second text menu and roller bar face are caused to be presented (step 114). The second roller bar face includes prompts such as Deposit, Withdrawal, Other Transaction, Cancel. In step 116–119 a determination is made as to which control button was depressed in response to step 114. If the Deposit button was indicated, the third face is presented (step 122) and the amount to be deposited is entered (step 124) and processed (step 126). Flow then continues to step 140 where the sixth face and text menu are presented that ask a user whether they have completed their transactions. Steps 126, 128, 135 and steps 130, 132, 136 are analogous to steps 122, 124, though they are for Withdrawal and Other Transaction, respectively, and thus utilize the fourth and fifth faces. Cancel and abort processing are shown as steps 154 and 155, respectively, though it should be recognized that cancel and abort processing can activated at any time as is the conventional protocol.

If a user indicates, in steps 142, that another transaction is not desired, then flow terminates. If another transaction is desired, flow returns to step 114 where the general menu and roller bar face (the second menu and roller bar face) are presented.

Figure 4:
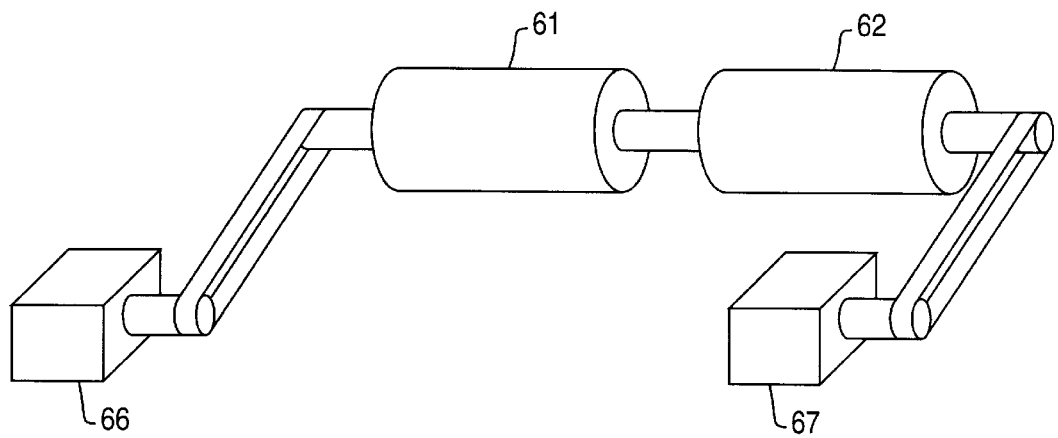
FIG. 4 is a diagram of a two section roller bar with separate drive mechanisms in accordance with the present invention.

Referring to FIG. 4, a diagram of a two section roller bar with separate drive mechanisms in accordance with the present invention is shown. The roller bar sections 61 and 62, may be co-linear, but are preferably driven by separate motors 66, 67 such that an increased number of combinations of information fields is presented to the user. While two motors and roller bar sections are show in FIG. 4 it should be recognized that more sections and drive motors could be presented. For example, a ten faced roller bar with ten separate one unit information fields (and ten motors) could essentially become a Braille calculator or the like. The user could enter two numbers and select a mathematical operation. To effect input through the identification fields themselves, a motor release mechanism (such as a clutch) would have to be provided to permit a user to select the numbers. Implementing such a release mechanism would be apparent to one skilled in the art given the teachings herein.

Figure 5:
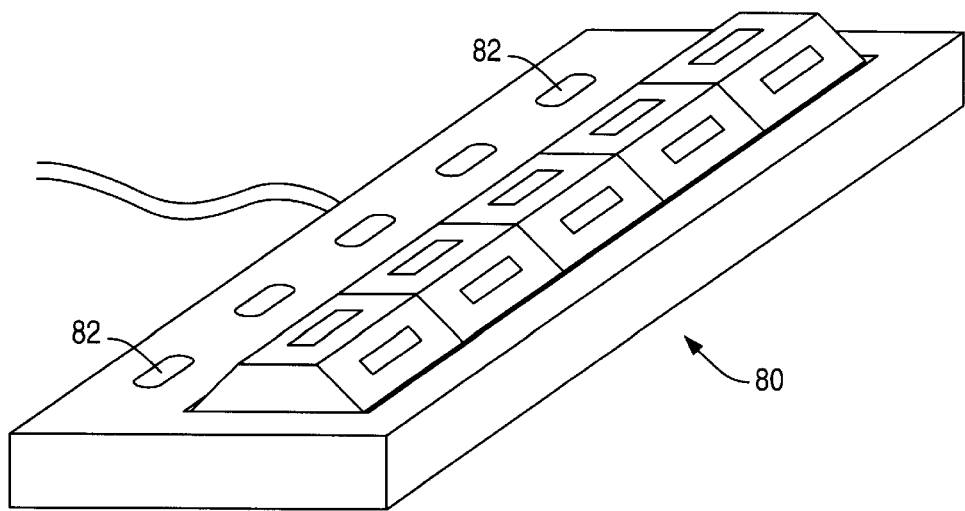
FIG. 5 is a stand alone or external visually aided input and/or output device in accordance with the present invention.

Referring to FIG. 5, a stand alone or external visually aided input and/or output device (also termed "external roller bar") in accordance with the present invention is shown. External roller bar 80 and control buttons 82 preferably function in the manner described above for roller bar 30 and control buttons 21. The motor or motors are preferably provided within the external roller bar housing. As described generally herein, external roller bar 80 can provide an interactive communication link with the remainder of an interface terminal (including personal computers and the like) with or without audio or another non-visual communication device.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

What is claimed is:

1. A computing device, comprising:
   processing logic;
   an input device coupled to said processing logic;
   an output device coupled to said processing logic;

a selectable member coupled to said input device that has a plurality of functions associated therewith;

a device that indicates in a non-visual manner which of said plurality of functions is associated with said selectable member at a given time; said non-visual indicating device including a plurality of faces each having a non-visual indicator formed thereon; and a drive mechanism coupled between said processing logic and said non-visual indicating device, said processing logic being capable of sending signals to said drive mechanism that cause said drive mechanism to move said plurality of faces such that one of said non-visual indicator is provided proximate said selectable member.

2. The apparatus of claim 1, further comprising:

a plurality of selectable members that each have a plurality of functions associated therewith; and a corresponding plurality of devices that respectively indicate in a non-visual manner which of said plurality of functions is associated with a respective selectable member at a given time.

3. The apparatus of claim 1, wherein said output device includes a display and the one of said plurality of functions that is associated with said selectable member at a given time changes as prompts on said display change.

4. The apparatus of claim 1, wherein said output device includes a display and said selectable member is provided adjacent said display.

5. The apparatus of claim 1, wherein said apparatus is an automated teller machine (ATM).

6. The apparatus of claim 1, wherein said non-visual indicating device produces an audio signal.

7. The apparatus of claim 1, wherein said non-visual indicating device includes function indicating members that may be understood by tactile sensation.

8. The apparatus of claim 7, wherein said function indicating members include one or more Braille characters.

9. The apparatus of claim 1, further comprising detection logic coupled to said processing logic that detects selection of said selectable member with a first of said plurality of functions associated therewith, and in response to said detected selection, causes a second of said plurality of functions to be associated therewith.

10. The apparatus of claim 8, wherein said detection logic causes a signal to be propagated to said drive mechanism that causes a first non-visual indicator corresponding to said first function to be moved away from said selectable member and a second non-visual indicator to be provided proximate said selectable member.

11. A non-visual function designating apparatus, comprising:

a device having a plurality of non-visual function designations that may be associated with a selectable member; and a drive mechanism that causes one of said function designations to be moved into a position to be associated with a selectable member.

12. The apparatus of claim 11, wherein said non-visual designation device includes a plurality of faces each including a plurality of function designations to be respectively associated with an equal number of selectable members.

* * * * *